United States Patent [19]

Tominaga

[11] Patent Number: 4,706,479
[45] Date of Patent: Nov. 17, 1987

[54] TANDEM ROLLING CONTROL SYSTEM

[75] Inventor: Yoshiharu Tominaga, Hyogo, Japan

[73] Assignee: Mitsubishi Denki Kabushiki Kaisha, Tokyo, Japan

[21] Appl. No.: 640,744

[22] Filed: Aug. 14, 1984

[30] Foreign Application Priority Data

Nov. 7, 1983 [JP] Japan .................................. 58-208859

[51] Int. Cl.4 ......................... B21B 37/06; B21B 37/08
[52] U.S. Cl. ............................................ 72/8; 72/11;
72/17; 72/20; 72/205; 72/234; 364/472
[58] Field of Search ................... 72/8, 17, 20, 234, 10,
72/11, 205; 364/472

[56] References Cited

U.S. PATENT DOCUMENTS

| 3,036,480 | 5/1962 | Schwab | 72/205 X |
| 3,851,509 | 12/1974 | Fox | 72/8 |
| 4,145,901 | 3/1979 | Imai et al. | 72/17 X |
| 4,240,147 | 12/1980 | Morooka et al. | 72/8 |
| 4,494,205 | 1/1985 | Dairiki et al. | 72/11 X |
| 4,513,594 | 4/1985 | Ginzburg et al. | 72/8 |

OTHER PUBLICATIONS

New Tension Control System in Finishing Stands of a Hot Strip Mill, Oishi et al., International Conference on Steel Rolling, The Iron and Steel Institute of Japan.

Primary Examiner—Robert L. Spruill
Assistant Examiner—Steve Katz
Attorney, Agent, or Firm—Bernard, Rothwell & Brown

[57] ABSTRACT

A system for controlling interstand tension of a tandem rolling mill includes a detector for directly detecting a travelling speed of a work between two neighboring stands. A value of a speed of the work thus obtained is processed by a tandem rolling controlling section together with a value of a load and another value of a rotational speed of rolls. A rotational speed of the rolls is thus determined in accordance with a result of the process.

1 Claim, 5 Drawing Figures

4,706,479

TANDEM ROLLING CONTROL SYSTEM

BACKGROUND OF THE INVENTION

1. Field of the Invention

This invention relates to a tandem rolling control system for controlling rolling speed in each stand of a hot or cold tandem rolling mill.

2. Description of the Prior Art

A typical one of conventional systems of the type as described above is illustrated in FIG. 1. Referring to FIG. 1, reference numeral 1 designates a rolling mill of a No. N stand, 2 another rolling mill of a No. N+1 stand, 3 a work or material to be rolled (this advances in a direction from the No. N to the No. N+1 stand), and 4 an electric motor for driving rolls of each of the rolling mills. In this arrangement, a variable speed electric motor is employed as the motor for the No. N stand.

Further, reference numeral 5 designates a detector for detecting a rotational speed of the electric motor (in FIG. 1, the detector is indicated by PG; a pilot generator), 6 a rolling speed controlling device, 9 a rolling load detector, and 10 a tension control device.

Now, operations of the system will be described.

In conventional tandem rolling technique, a good result of rolling is attained by controlling interstand tension either to a predetermined value or to zero.

This controlling method is described below.

Rolling torque is indirectly determined by calculating torque generated by the motor from a voltage, a current and a rotational frequency of the motor.

Referring to FIG. 2, reference numeral 1 designates a rolling mill in a No. N stand, 2 another rolling mill in a No. N+1 stand, and 3 a work or material to be rolled. (The work 3 advances in a direction from the No. N to the No. N+1 stand.)

In the system shown, a following equation stands $$G = aF - bT \qquad (1)$$

where F is a rolling force, G rolling torque, T tension, a torque arm length and b tension arm length.

After the work has been bit into by the No. N stand and before it is bit into by the No. N+1 stand, $$G_o = aF_o$$

$$\therefore a = G_o/F_o \qquad (2)$$

Further, after the work has been bit into the No. N+1 stand, a following equation stands $$G = aF - bT \qquad (3)$$

Accordingly, from the equations (2) and (3) above, interstand tension T is given by a following equation $$T = (1/b)(G_o/F_o \cdot F - G)$$

As apparent from the foregoing description, interstand tension T can be detected from the torque $G_o$ generated by the motor (= rolling torque) and the rolling force $F_o$ after the work has been bit into by the No. N stand and before it is bit into by the No. N+1 stand, and the torque G generated by the motor and the rolling force F after the work has been bit into by the No. N+1 stand.

Thus, it has been a practice that, during tandem rolling, a No. N stand rolling speed correcting reference is produced from a tension control device so as to control the interstand tension T to an aimed value.

A conventional tandem rolling control employs a tension controlling method using a tension control device. According to this method, interstand tension is indirectly determined from a voltage, a current and a speed of an electric motor in this way, and hence accuracy in detection is low. Besides it is disadvantageous in that controlling responsiveness to a disturbance such as a skid mark and so on is so low that a slip scar may possibly be caused to appear on a work or material to be rolled.

SUMMARY OF THE INVENTION

It is an object of the present invention to provide a tandem rolling control system which can assure stabilized tandem rolling with high accuracy.

A tandem rolling control system includes a speed detector for detecting a travelling speed of a work or material to be rolled between two neighboring stands and for outputting a corresponding speed signal. The speed signal is delivered to a tandem rolling controlling section together with a rolling load signal representative of a rolling load of rolls of that one of the two neighboring rolling stands in question which is located on the upstream side along a rolling direction and a rotational speed signal representative of a rotational speed of an electric motor for driving the rolls of the upstream side rolling stand. The tandem rolling controlling section produces, in response to a rolling load signal, a rotational speed signal and a speed signal, a signal which is necessary to control the rotational speed of the rolls of the upstream side rolling stand such that tension acting upon a work between the two neighboring rolling stands in question may be maintained to a predetermined value.

DETAILED DESCRIPTION OF THE PREFERRED EMBODIMENTS

Figure 1:
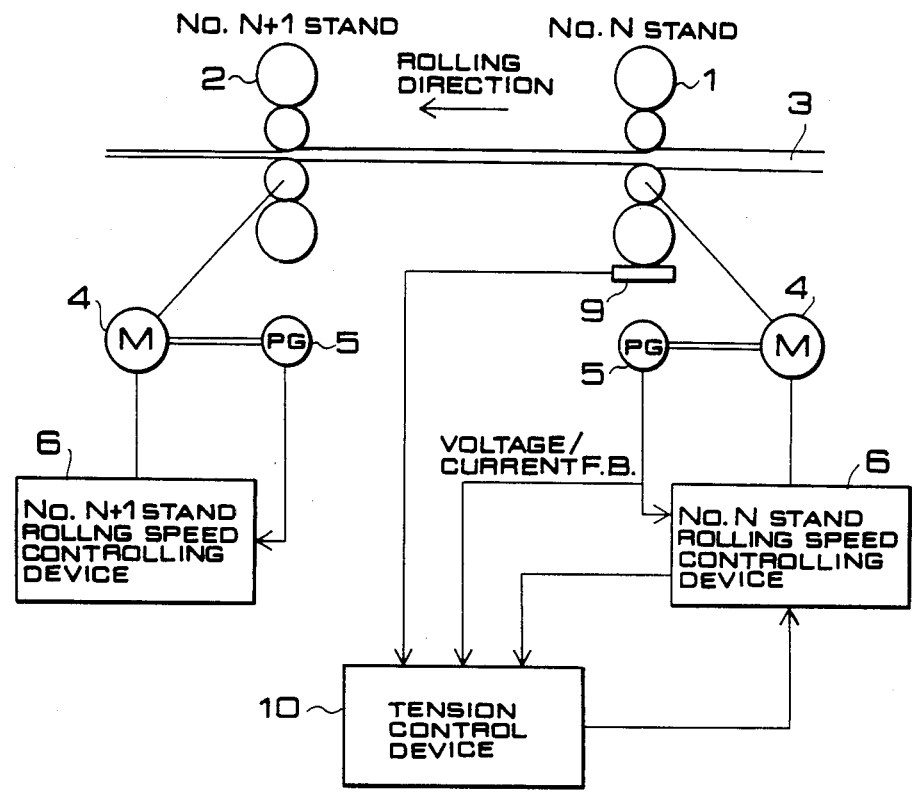
FIG. 1 is a block diagram of a conventional rolling control system.
Figure 2:
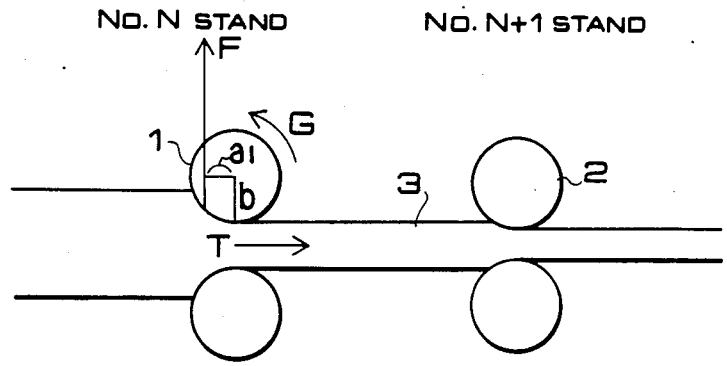
FIG. 2 is a diagram illustrating a work being rolled by rolls of the system shown in FIG. 1.
Figure 3:
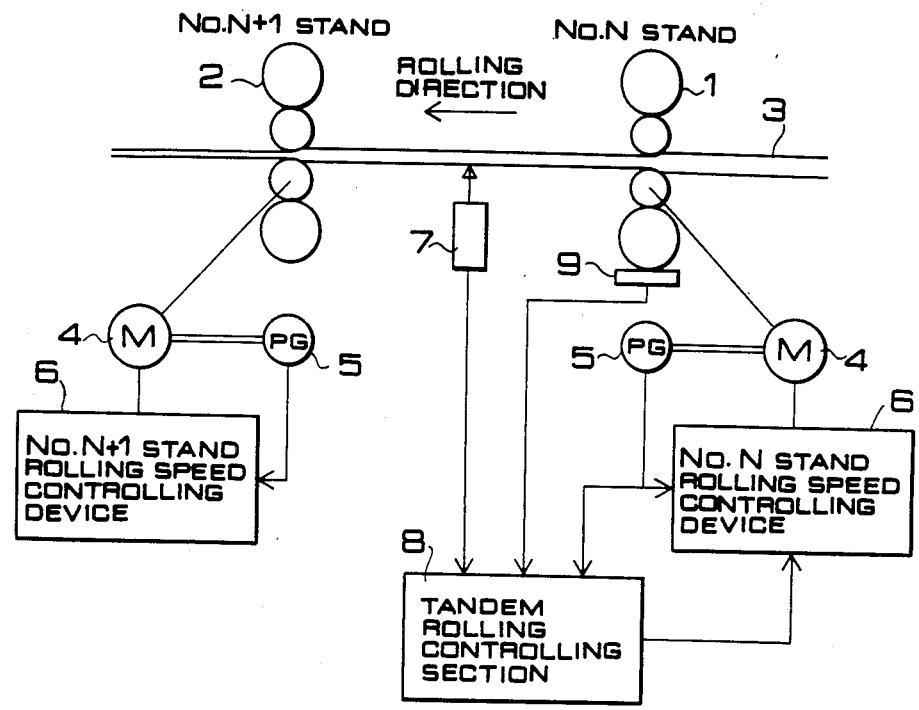
FIG. 3 is a block diagram showing a tandem rolling control system according to the present invention.

Now, a preferred embodiment of the present invention will be described with reference to the accompanying drawings. Referring to FIG. 3, reference numeral 1 designates a rolling mill in the No. N stand, 2 another rolling mill in the No. N+1 stand, 3 a work or material to be rolled (this advances in a direction from the No. N to the No. N+1 stand), and 4 an electric motor for driving rolls of the rolling mill. In this arrangement, a variable speed electric motor is employed as the motor for the No. N stand.

Further, reference numeral 5 designates a detector for detecting a rotational speed of the electric motor (in FIG. 3, the detector is represented by PG; a pilot generator), 6 a rolling speed controlling device, 7 a speed detecting device for detecting a speed of a work, and 8 a tandem rolling controlling section. Further, reference numeral 9 designates a rolling load detector.

Operations of the system will be described below with reference to FIGS. 4 and 5.

Figure 4:
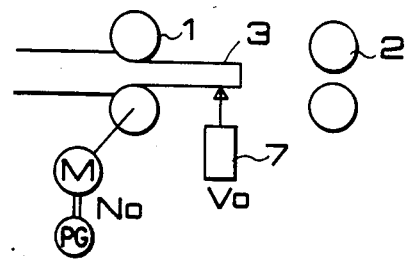
FIGS. 4 and 5 are diagrams illustrating a work passing successively through two neighboring stands.

FIG. 4 illustrates a work after it has been bit into by the No. N stand and just before it is bit into the No. N+1 stand. Meanwhile, FIG. 5 illustrates the work after it has been bit into by both the No. N stand and the No. N+1 stand.

At the first step, the speed detecting device 7 detects and stores in tandem rolling controlling section 8 a speed Vo of a work and another speed No of the electric motor for driving rolls of the No. N stand rolling mill is also detected and stored in the tandem rolling controlling section.

Figure 5:
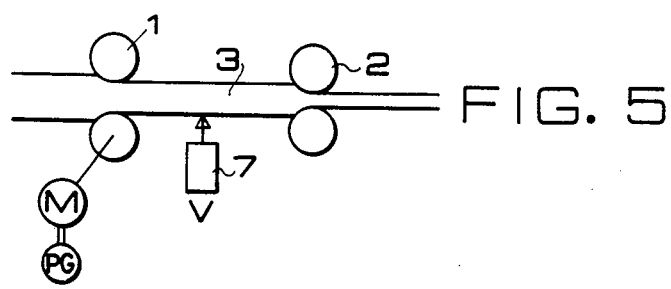

Then as shown in FIG. 5, at the second step (after the work has been bit into a stand downstream of a plate speed meter), a plate speed V is detected by the speed detecting device 7, and calculation for determining the rotational speed of the electric motor of the No. N stand is carried out by the tandem rolling controlling section 8 in accordance with a following equation $$N = V \cdot No/Vo \cdot f(F) \qquad (5)$$

where N is a rotational speed of the electric motor for driving rolls of the No. N stand, and f(F) is a rolling load to the No. N stand. A result of the calculation is delivered as a speed instruction to the rolling speed controlling device 6 of the No. N stand. The controlling device 6 thus controls the rotational speed of the electric motor 4 such that a value of a rotational speed signal detected by the rotational speed detector 5 may coincide with a value of a speed instruction from the tandem rolling controlling section 8.

As apparent from the foregoing description, according to the present invention, a speed of a work or material to be rolled is detected directly by means of a speed detecting device to control tandem rolling. Accordingly, the system of the invention can respond quickly to disturbances of the speed and tension of a high frequency such as a skid mark and can thus assure tandem rolling with high accuracy.

What is claimed is:

1. A tandem rolling control system for controlling a tandem rolling mill which includes two neighboring rolling stands through which a material to be rolled passes sucessively, each of said rolling stands including a pair of rolls and an electric motor for driving one of said pair of rolls, said control system comprising:

a rotational speed detector connected to each motor for detecting a rotational speed of each electric motor and for outputting a corresponding rotational speed signal;

a rolling load detector for detecting a rolling load acting upon the upstream pair of rolls and for outputting a corresponding rolling load signal;

a speed detecting device for detecting a travelling speed of the material to be rolled between the two neighboring rolling stands and for outputting a corresponding travelling speed signal;

a rolling speed controlling device for controlling a rotational speed of each electric motor for driving said pairs of rolls, the downstream rolling speed controlling device being responsive to the rotational speed signal from the rotational speed detector of the downsteam stand; and a tandem rolling controlling section responsive to the rotational speed signal of the rotational speed detector of the upstream stand, the rolling load signal and the travelling speed signal for effecting a calculation required to maintain to a proper value the rotational speed of the electric motor of the upstream stand to maintain proper tension of the material between said two neighboring rolling stands and for delivering a resultant value of the calculation to said rolling speed controlling device of the upstream stand as a speed instruction;

said tandem rolling controlling section including means for storing (1) a value of a travelling speed signal representative of the travelling speed of the material to be rolled which is fed out from the upstream one of said two neighboring rolling stands after it has been bit into by said upstream one of said neighboring rolling stands and (2) a rotational speed signal of said electric motor of said upstream one of said neighboring rolling stands, and means for effecting a predetermined calculation after the material to be rolled has been bit successively into by the two neighboring rolling stands in accordance with the equation $$N = V \cdot No/Vo \cdot f(F)$$

wherein N is the proper rotational speed of the upstream motor,
V is the travelling speed signal,
Vo is the stored value of travelling speed signal,
No is the stored value of the rotational speed signal, and
f(F) is the detected rolling load signal.

* * * * *